United States Patent
Park

(10) Patent No.: US 12,288,634 B2
(45) Date of Patent: Apr. 29, 2025

(54) POWER SUPPLY APPARATUS DETECTING GAS LEAK

(71) Applicant: KOREA GAS CORPORATION, Daegu (KR)

(72) Inventor: Jeong In Park, Incheon (KR)

(73) Assignee: KOREA GAS CORPORATION, Daegu (KR)

( * ) Notice: Subject to any disclaimer, the term of this patent is extended or adjusted under 35 U.S.C. 154(b) by 153 days.

(21) Appl. No.: 18/278,291

(22) PCT Filed: Nov. 2, 2020

(86) PCT No.: PCT/KR2020/015166
§ 371 (c)(1),
(2) Date: Aug. 22, 2023

(87) PCT Pub. No.: WO2022/092375
PCT Pub. Date: May 5, 2022

(65) Prior Publication Data
US 2024/0117942 A1 Apr. 11, 2024

(51) Int. Cl.
*H01B 7/32* (2006.01)
*F17C 13/02* (2006.01)
(Continued)

(52) U.S. Cl.
CPC ............. *H01B 7/32* (2013.01); *F17C 13/025* (2013.01); *F17C 13/123* (2013.01); *G01M 3/2815* (2013.01); *H02G 3/0462* (2013.01); *H02G 3/24* (2013.01); *H02G 3/383* (2013.01); *H02G 15/18* (2013.01); *H02G 15/28* (2013.01); *F17C 2205/0323* (2013.01); *F17C 2205/0352* (2013.01); *F17C 2221/012* (2013.01);
(Continued)

(58) Field of Classification Search
CPC .......... H01B 7/32; H02G 15/18; H02G 15/28; H02G 3/24; H02G 3/383; H02G 3/0462
See application file for complete search history.

(56) References Cited

U.S. PATENT DOCUMENTS 4,939,923 A 7/1990 Sharp
2018/0351285 A1* 12/2018 Bigi ........................ H02G 9/00

FOREIGN PATENT DOCUMENTS

CN 108767804 A * 11/2018
JP 2012-189242 A 10/2012
(Continued)

*Primary Examiner* — Atif H Chaudry
(74) *Attorney, Agent, or Firm* — Bridgeway IP Law Group, PLLC; Sang Ho Lee; Hyun Woo Shin

(57) ABSTRACT

According to an embodiment of the present invention, a power supply apparatus for detecting a gas leak is provided. The apparatus may include: a power supply pipe which is connected to a pump and has a power line passing therethrough, the power line supplying power from a power supply unit to a motor in the pump; a flexible joint pipe having one side connected to the power supply pipe and the other side connected to the power supply unit; a power inlet unit having one side facing the pump and the other side positioned on the power supply pipe so as to face the power supply unit to connect the power line, and preventing gas leak from one side to the other side in the pump; and a leak detection unit which fills the power supply pipe with an inert gas and detects a gas leak according to a change in pressure.

20 Claims, 5 Drawing Sheets

(51) Int. Cl.

| | |
|---|---|
| *F17C 13/12* | (2006.01) |
| *G01M 3/28* | (2006.01) |
| *H02G 3/04* | (2006.01) |
| *H02G 3/30* | (2006.01) |
| *H02G 3/38* | (2006.01) |
| *H02G 15/18* | (2006.01) |
| *H02G 15/28* | (2006.01) |

(52) U.S. Cl.
CPC .. *F17C 2221/033* (2013.01); *F17C 2221/035* (2013.01); *F17C 2227/0135* (2013.01); *F17C 2250/043* (2013.01); *F17C 2250/0636* (2013.01); *F17C 2260/044* (2013.01)

(56) References Cited

FOREIGN PATENT DOCUMENTS

| | | | |
|---|---|---|---|
| KR | 10-2014-0092866 A | | 7/2014 |
| KR | 10-2017-0009274 A | | 1/2017 |
| KR | 20170009274 A | * | 1/2017 |
| KR | 10-2020-0106677 A | | 9/2020 |

* cited by examiner

POWER SUPPLY APPARATUS DETECTING GAS LEAK

TECHNICAL FIELD

The present invention relates to a power supply apparatus for detecting a gas leak.

BACKGROUND ART

Generally, pumps for liquefied gases, such as liquefied natural gas (LNG), liquefied petroleum gas (LPG), and liquefied hydrogen, receive electricity of an energy source, generate a pressure and a flow rate by motor rotational force, transmit the liquefied gases, and operate with motors immersed in cryogenic and low-pressure liquefied gases.

Specifically, a motor of a liquefied gas pump operates after receiving power from the outside to the inside thereof through a wire. Typically, the power for the motor is supplied through a "feedthrough," which is a power inlet device, at a boundary between an inner surface where a high-pressure liquefied gas is present and an outer surface where atmospheric pressure is present.

However, depending on environmental conditions of the space around the pump or an operating state of the pump, the liquefied gas in the pump continuously applies a thermal impact to the feedthrough. Therefore, there is a problem in that sealing cannot be maintained and a liquefied gas leaks to the outside.

DISCLOSURE

Technical Problem

The present invention is directed to providing a power supply apparatus.

It should be noted that objects of the present invention are not limited to the above-described objects, and other objects of the present invention will be apparent to those skilled in the art from the following descriptions.

Technical Solution

One aspect of the present invention provides a power supply apparatus for detecting a gas leak. The power supply apparatus may include a power supply pipe which is connected to a pump and through which a power line, which supplies power to a motor in the pump from a power supply unit, passes, a flexible joint pipe whose one side is connected to the power supply pipe and the other side is connected to the power supply unit, a power inlet unit positioned at the power supply pipe such that one side of the power inlet unit faces the pump and the other side faces the power supply unit to connect the power line and configured to prevent a gas in the pump from leaking from the one side to the other side, and a leak detection unit configured to fill the power supply pipe with an inert gas and detect a gas leak according to a change in pressure.

The flexible joint pipe may be separated from the power supply unit by separating and bending only the other side of the flexible joint pipe from the power supply unit in a state in which the one side of the flexible joint pipe is coupled to the power supply pipe.

The power supply apparatus may further include a support configured to support the flexible joint pipe in a state in which one region of the flexible joint pipe is seated on the support and the other side of the flexible joint pipe is separated from the power supply unit.

A sealing sleeve for sealing may be disposed on at least one of the one side and the other side of the flexible joint pipe, at least one communication hole through which the power line passes may be formed at an inner side of the sealing sleeve, and at least one sealing ring may be provided along a circumference of the communication hole.

The leak detection unit may include a gas supply unit configured to supply the inert gas to the power supply pipe, an inlet pipe connecting the gas supply unit to an inlet unit of the power supply pipe, a gas discharge unit configured to discharge the inert gas in the power supply pipe, a discharge pipe connecting a discharge unit of the power supply pipe to the gas discharge unit, an inlet valve provided at the inlet pipe and configured to control an inlet flow of the inert gas, a discharge valve provided at the discharge pipe and configured to control a discharge flow of the inert gas, a pressure gauge provided at the discharge pipe and configured to measure a pressure of the inert gas in the discharge pipe, and a controller configured to control an inflow and discharge of the inert gas and detect leakage of the inert gas.

After the inert gas is supplied to the power supply pipe, the controller may close the inlet valve and the discharge valve to maintain an inside of the power supply pipe at a predetermined reference pressure, and when the pressure in the discharge pipe increases or decreases from the reference pressure, the controller may determine that leakage occurs.

When the pressure in the discharge pipe increases or becomes greater than a first critical pressure, the controller may determine that an active gas in the pump leaks, and when the pressure in the discharge pipe decreases or becomes lower than a second critical pressure, the controller may determine that the inert gas leaks from the leak detection unit.

When gas leakage occurs, the controller may supply the inert gas by opening the inlet valve. When gas leakage occurs, the controller may close the inlet valve and open the discharge valve to discharge the gas in the discharge pipe.

The power supply pipe may include a plurality of pipes, and the power inlet unit may be flange-coupled between the plurality of pipes.

Advantageous Effects

In accordance with the present invention, by filling a pipe with an inert gas, it is possible to prevent fire or explosion when a gas leak occurs.

In accordance with the present invention, the gas leak can be detected according to a gas pressure change in the pipe, and when the gas leak occurs, a purge operation can be performed to reduce the probability of an accident or to quickly deal with such an accident.

In accordance with the present invention, by using a flexible joint pipe, it is possible to secure a work space without separating and disassembling the entire pipe during maintenance and repair, such as replacement of a power line.

In accordance with the present invention, a power inlet unit can maintain sealing even during expansion and contraction due to a thermal impact generated during an operation of a pump to secure durability that sufficiently withstands a temperature and a pressure, and leakage of a gas in the pump can be prevented. By preventing a gas leak, it is possible to prevent occurrence of accidents such as fire and explosion and to improve safety of the pump that delivers inflammable gases.

DESCRIPTION OF DRAWINGS

In order to more fully understand the accompanying drawings described in the detailed description of the present invention, a brief description of each drawing is provided.

MODES OF THE INVENTION

Figure 1:
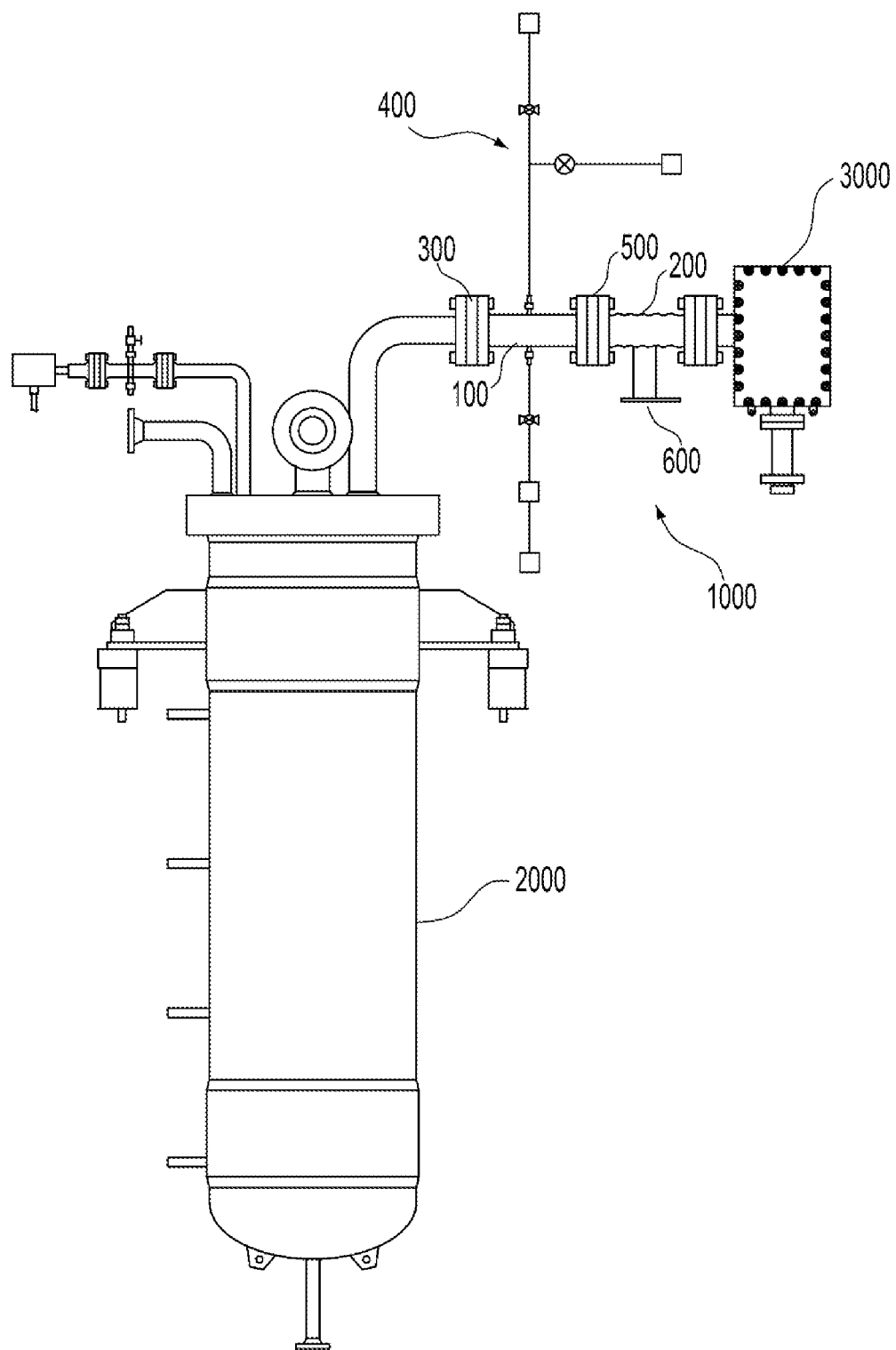
FIG. 1 is a diagram for describing a power supply apparatus for detecting a gas leak according to an embodiment of the present invention.

Hereinafter, exemplary embodiments according to the present invention will be described in detail with reference to the content described in the accompanying drawings. The same reference numeral or symbol in each drawing indicates parts or components that perform substantially the same function. Hereinafter, for convenience of description, upward, downward, left, and right directions are based on the drawings, and the scope of the present invention is not necessarily limited to the corresponding directions.

Terms including ordinal numbers such as "first," "second," and the like used herein can be used to describe various components, but the components are not limited by these terms. The terms are used only for the purpose of distinguishing one component from another component. For example, without departing from the scope of the present invention, a first component may be referred to as a second component, and similarly, a second component may also be referred to as a first component. The term "and/or" includes a combination of a plurality of related items or any one of the plurality of related items.

The terms used herein are used to describe the embodiments and are not intended to restrict and/or limit the present invention. Unless the context clearly dictates otherwise, the singular form includes the plural form. In the present specification, the terms "comprising," "having," and the like are used to specify that a feature, a number, a step, an operation, a component, an element, or a combination thereof described herein exists, and they do not preclude the presence or addition of one or more other features, numbers, steps, operations, components, elements, or combinations thereof.

Throughout this disclosure, when a first portion is referred to as being connected to a second portion, this includes not only being directly connected, but also being indirectly connected by interposing a third portion between the first portion and the second portion. In addition, when a part is referred to as including a component, this means that the part can include another component, not excluding another component unless specifically stated otherwise.

In addition, the terms "portion," "module," and the like used herein refer to a unit for processing at least one function or operation, and this unit may be implemented by hardware, software, or a combination of hardware and software.

Figure 2:
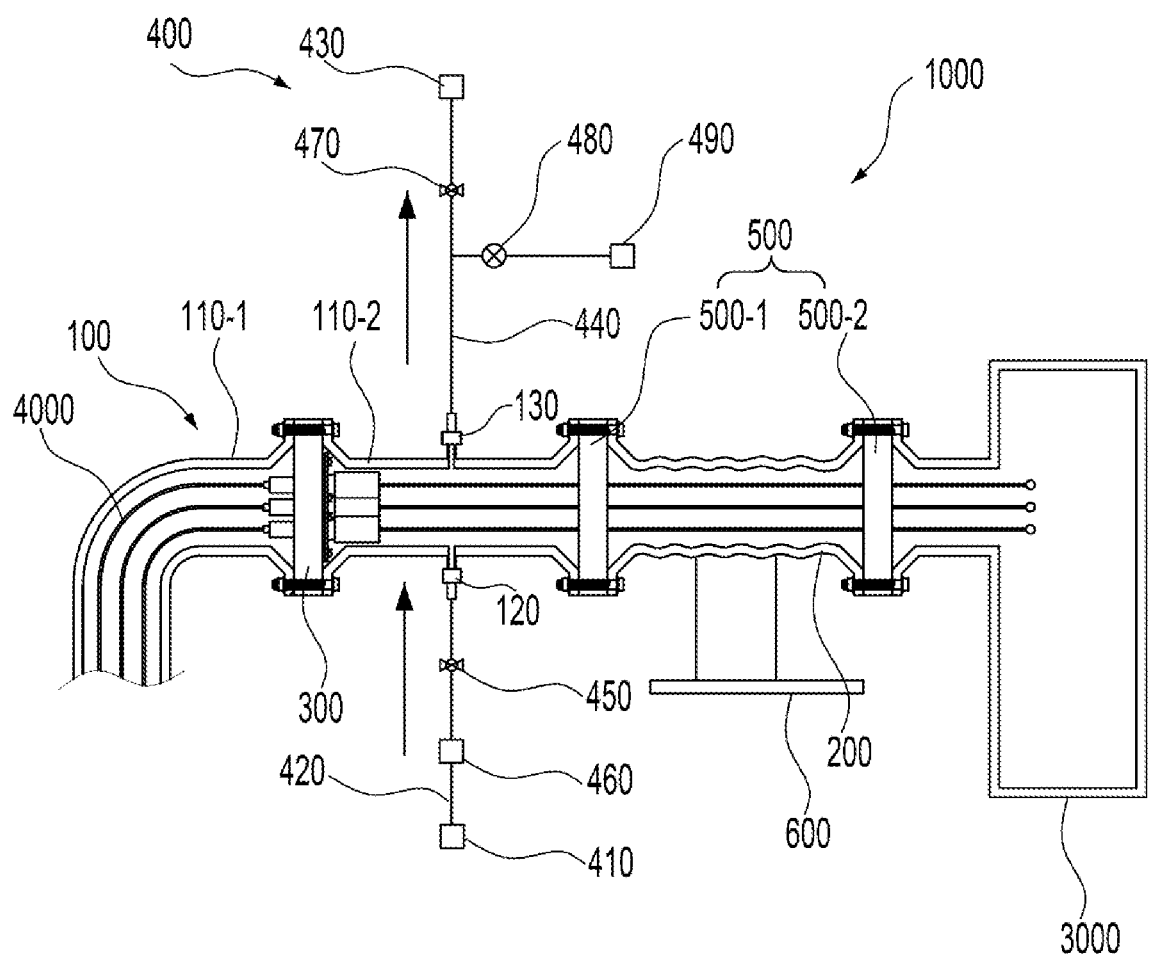
FIG. 2 is a cutaway cross-sectional view illustrating a portion of the power supply apparatus for detecting a gas leak according to an embodiment of the present invention.

FIG. 1 is a diagram for describing a power supply apparatus for detecting a gas leak according to an embodiment of the present invention, and FIG. 2 is a cutaway cross-sectional view illustrating a portion of the power supply apparatus for detecting a gas leak according to an embodiment of the present invention.

A power supply apparatus 1000 may be provided between a pump 2000 and a power supply unit 3000 and transmit power from the power supply unit 3000 to the pump 2000. Specifically, the pump 2000 may include a pump housing and a motor in the pump housing, and an inside of the pump housing may be filled with an active gas (e.g., a liquefied gas such as liquefied natural gas (LNG), liquefied petroleum gas (LPG), liquefied hydrogen, or the like). The motor may be connected to a power line 4000 passing through the power supply apparatus 1000 and receive power. The pump 2000 may be, for example, an LNG pump, an LPG pump, or a hydrogen pump, but the present invention is not limited thereto.

The power supply apparatus 1000 may include a power supply pipe 100, a flexible joint pipe 200, a power inlet unit 300, and a leak detection unit 400.

The power supply pipe 100 may be made of a pipe having a hollow therein, one end of the power supply pipe 100 may be connected to the pump 2000, and the power line 4000, which supplies power from the power supply unit 3000 to the motor in the pump 2000, may be provided in the power supply pipe 100.

In the embodiment, the power supply pipe 100 may include a plurality of pipes 110-1 and 110-2, and the plurality of pipes 110-1 and 110-2 may be flange-coupled to each other through flange portions provided at end portions thereof. In this case, the power inlet unit 300 is provided between the plurality of pipes and may be mounted by being flange-coupled to the flange portions through bolt engagement. However, the present invention is not limited thereto.

The flexible joint pipe 200 is a bendable pipe, and one side of the flexible joint pipe 200 may be connected to the power supply pipe 100 and the other side thereof may be connected to the power supply unit 3000. For example, a flange portion provided on one side of the flexible joint pipe 200 may be connected to the power supply pipe 100 while flange-coupled to the flange portion of the power supply pipe 100 through bolt engagement. In addition, for example, a flange portion provided on the other side of the flexible joint pipe 200 may be connected to the power supply unit 3000 while flange-coupled to a flange portion of a joint box of the power supply unit 3000 through bolt engagement.

The flexible joint pipe 200 may be bent to easily connect the power supply pipe 100 to the power supply unit 3000 and to facilitate maintenance and repair such as replacement of the power line 4000. For example, instead of the flexible joint pipe 200, when a non-flexible joint pipe connects the power supply pipe 100 to the power supply unit 3000, in order for maintenance and repair work such as replacement of the power line 4000, the non-flexible joint pipe should be separated from the power supply pipe 100 and the power supply unit 3000 (specifically, the joint box) and moved from the power supply unit 3000. Consequently, there is a disadvantage in that equipment such as a chain block for moving the non-flexible joint pipe and a number of workers are required. However, according to the embodiment of the present invention, since only the other side of the flexible joint pipe 200 is bent while separated from the power supply unit 3000 when one side of the flexible joint pipe 200 is coupled to the power supply pipe 100, the flexible joint pipe 200 may be separated from the power supply unit 3000. In this case, maintenance and repair work such as replacement of the power line 4000 may be performed through the separated space.

The power inlet unit 300 may be positioned in the power supply pipe 100 such that one side of the power inlet unit 300 faces the pump 2000 and the other side thereof faces the power supply unit 3000. Specifically, the power inlet unit 300 is provided at the power supply pipe 100, particularly between the pipes of the power supply pipe 100, and thus electrodes 340 may be provided on both sides of the power inlet unit 300. The power line 4000 extending from the power supply unit 3000 and the power line 4000 extending from the motor are connected to the electrode 340, and thus power of the power supply unit 3000 may be directed to the motor via the power inlet unit 300. In addition, the power inlet unit 300 may seal the pipes on both sides to prevent a gas leak, for example, leakage of a gas in the pump 2000 and/or the power supply pipe 100 through the power inlet unit 300.

The leak detection unit 400 may fill the power supply pipe 100 with an inert gas and detect a gas leak through a pressure change. In this case, the inert gas may be, for example, nitrogen gas, but the present invention is not limited thereto.

In the embodiment, the leak detection unit 400 may include a gas supply unit 410 configured to supply an inert gas to the power supply pipe 100, an inlet pipe 420 connecting the gas supply unit 410 to the inlet unit 120 of the power supply pipe 100, a gas discharge unit 430 configured to discharge the inert gas in the power supply pipe 100, a discharge pipe 440 connecting the discharge unit 130 to the gas discharge unit 430 of the power supply pipe 100, an inlet valve 450 provided at the inlet pipe 420 and configured to control an inlet flow of the inert gas, a regulator 460 provided at the inlet pipe 420 and configured to control a hydraulic pressure and a flow rate of the inert gas, a discharge valve 470 provided at the discharge pipe 440 and configured to control a discharge flow of the inert gas, a pressure gauge 480 provided at the discharge pipe 440 and configured to measure a pressure of the inert gas in the discharge pipe 440 and transmit the measured pressure to a controller 490, and the controller 490 configured to control an inflow and a discharge of the inert gas and detect a gas leak.

In the embodiment, after an inert gas is supplied to the power supply pipe 100, the controller 490 may close the inlet valve 450 and the discharge valve 470 to maintain an inside of the power supply pipe 100 at a predetermined reference pressure. In this case, when a pressure in the discharge pipe 440 increases or decreases from the reference pressure, it may be determined that a gas leak occurs.

In the embodiment, when the pressure in the discharge pipe 440 increases or exceeds a predetermined first critical pressure, the controller 490 may determine that the active gas in the pump 2000 leaks. In addition, when the pressure in the discharge pipe 440 decreases or becomes lower than a predetermined second critical pressure, the controller 490 may determine that the inert gas leaks from the leak detection unit 400.

In the embodiment, when a gas leak occurs, the controller 490 may close the inlet valve 450 and open the discharge valve 470 to discharge the gas in the discharge pipe 440. Additionally/alternatively, when the gas leak occurs, the controller 490 may supply an inert gas by opening the inlet valve 450.

In the embodiment, a sealing sleeve 500 for sealing may be disposed on at least one of one side and the other side of the flexible joint pipe 200. Both sides of the sealing sleeve 500 are blocked while allowing the power line 4000 to pass therethrough, thereby preventing a gas leak. Specifically, the sealing sleeve 500 may include a first sealing sleeve 500-1 provided between the flexible joint pipe 200 and the power supply pipe 100 and a second sealing sleeve 500-2 provided between the flexible joint pipe 200 and the power supply unit 3000. However, the present invention is not limited thereto.

In the embodiment, the power supply apparatus 1000 may further include a support 600 supporting the flexible joint pipe 200. The support 600 is formed in a vertical direction from the ground toward the flexible joint pipe 200, and one region of the flexible joint pipe 200 may be seated on an upper end portion of the support 600. Therefore, even in a state in which the other side of the flexible joint pipe 200 is separated from the power supply unit 3000, the flexible joint pipe 200 may be supported without a separate support facility. However, a shape of the support 600 is exemplary, and various shapes for supporting the flexible joint pipe 200 may be applied.

The power supply apparatus 1000 shown in FIGS. 1 and 2 is exemplary, and various configurations may be applied according to embodiments to which the present invention is applied.

Figure 3:
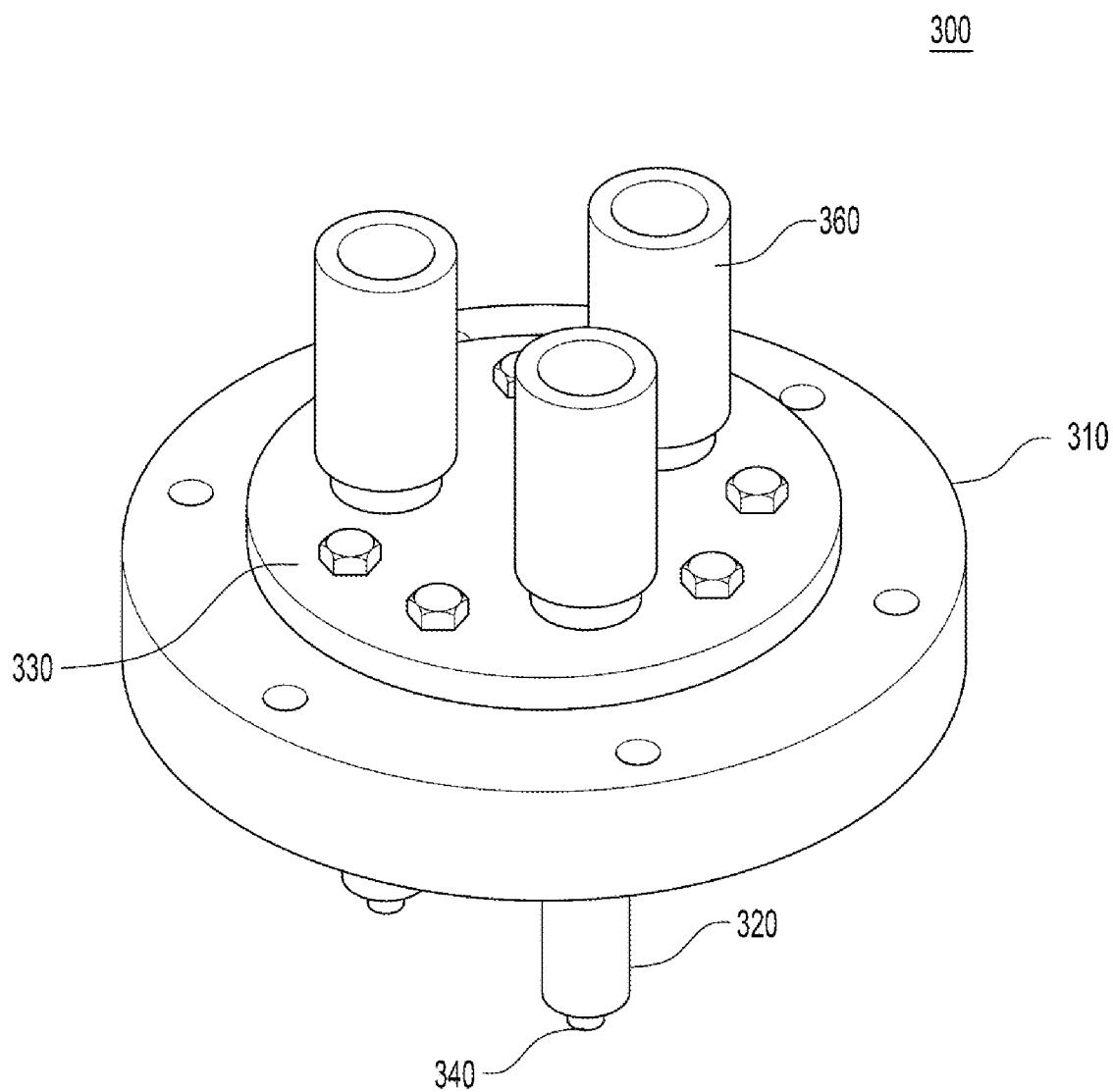
FIG. 3 is a perspective view illustrating a power inlet unit according to an embodiment of the present invention.
Figure 4:
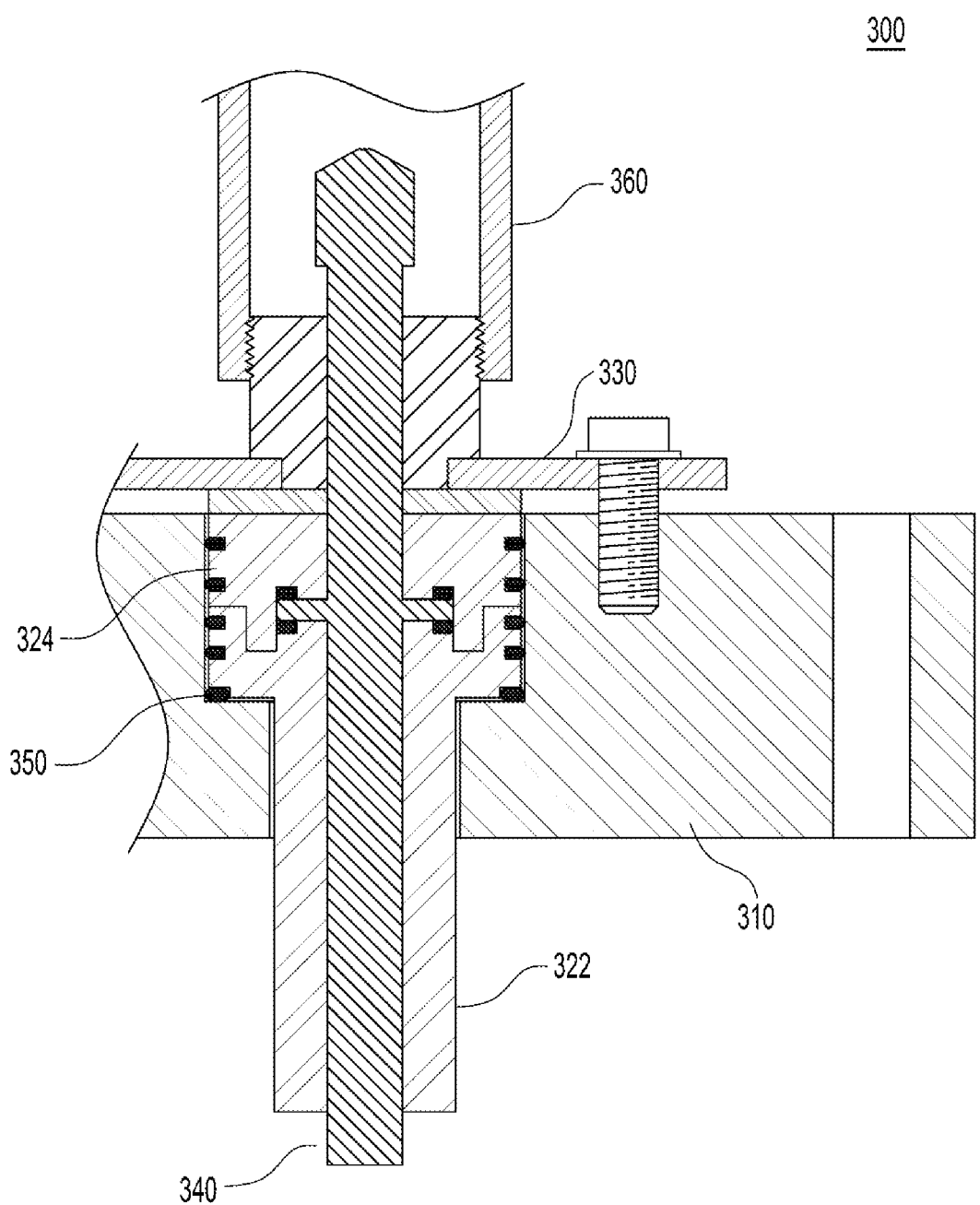
FIG. 4 is a cross-sectional view illustrating the power inlet unit of the present invention.

FIG. 3 is a perspective view illustrating a power inlet unit according to an embodiment of the present invention, and FIG. 4 is a cross-sectional view illustrating the power inlet unit of the present invention.

Referring to FIGS. 3 and 4, the power inlet unit 300 may include a base 310, an electrode support 320, a pressing unit 330, the electrode 340, a sealing unit 350, and an insulation sleeve 360.

The base 310 is mounted on the power supply pipe 100, and a plurality of bolt through-holes may be formed outward to pass through the base 310. Here, the bolt through-holes may be formed to correspond to bolt holes of the flange portion of the power supply pipe 100 to allow the power inlet unit 300 to be flange-coupled to the power supply pipe 100.

At least one electrode mounting unit may be formed to pass through the inside of the base 310. The electrode support 320 and the electrode 340 may be disposed in the electrode mounting unit. Specifically, the electrode support 320 may be disposed to be pressed against the electrode mounting unit, and the electrode 340 may be disposed to be pressed against an inner side of the electrode support 320. When the power supply unit 3000 supplies three-phase power, three electrodes 340 and three electrode mounting units may be provided in the power inlet unit 300. However, the present invention is not limited thereto.

The electrode support 320 disposed in the electrode mounting unit may include a first electrode support 322 and a second electrode support 324. In this case, the first electrode support 322 and the second electrode support 324 may each be formed of an insulator. In particular, the first electrode support 322 and the second electrode support 324 may be disposed in close contact with each other in a pass-through direction of the electrode mounting unit, and in particular, protrusions and grooves corresponding to each other may be formed on facing surfaces of the first electrode support 322 and the second electrode support 324 to approach each other. The first electrode support 322 may protrude from one surface of the base 310 toward the pump 2000, and the second electrode support 324 may protrude from one surface of the base 310 toward the power supply unit 3000.

The first electrode support 322 and the second electrode support 324 may be supported to be stably positioned against an external force generated in the pass-through direction.

First, in order to support the first electrode support 322, an inner diameter of the electrode mounting unit may be varied in the pass-through direction, and in response to the variation, an outer diameter of the first electrode support 322 may be varied. In this way, since a surface of the electrode mounting unit whose inner diameter is varied supports a surface of the first electrode support 322 whose outer diameter is varied, the first electrode support 322 and the second electrode support 324 may be fixed without moving toward the motor.

Specifically, the electrode mounting unit may include a first electrode mounting unit having a narrow inner diameter and a second electrode mounting unit having a wide inner diameter, and the first electrode support 322 may have a shape corresponding thereto.

In addition, in order to support the second electrode support 324, the pressing unit 330 may press the second electrode support 324. Specifically, the pressing unit 330 presses the second electrode support 324 while coupled to the base 310 to support the second electrode support 324, and simultaneously, the second electrode support 324 is brought into close contact with the first electrode support 322 and the electrode 340 so that sealing may be further improved.

One region is formed to pass through the insides of the first electrode support 322 and the second electrode support 324 so that the electrode 340 may be coupled to pass through the one region. In this case, one end portion of the electrode 340 may protrude toward the pump 2000, and the other end portion may protrude toward the power supply unit supplying power to the pump 2000. The power line 4000 may be connected to both end portions of the electrode 340.

In order to stably fix the electrode 340, a seating plate of the electrode 340 may protrude outward. The seating plate may be provided between the first electrode support 322 and the second electrode support 324 and supported by the first electrode support 322 and the second electrode support 324. In addition, to this end, a plate insertion groove into which the seating plate is insertable may be formed on close contact surfaces of the first electrode support 322 and the second electrode support 324.

At least one sealing unit 350 may be provided between the electrode support 320 and the electrode mounting unit and/or between the seating plate and the electrode support 320 to further improve sealing performance. The sealing unit 350 may be, for example, an O-ring member. However, the present invention is not limited thereto.

The insulation sleeve 360 is for improving insulation performance of a connection unit of the end portion of the electrode 340, and the insulation sleeve 360 may be screw-coupled to an end portion of the second electrode support 324. However, the present invention is not limited thereto, and additionally/alternatively, the insulation sleeve 360 may be coupled to the first electrode support 322.

The power inlet unit 300 shown in FIGS. 3 and 4 is exemplary, and various configurations may be applied according to embodiments to which the present invention is applied.

Figure 5:
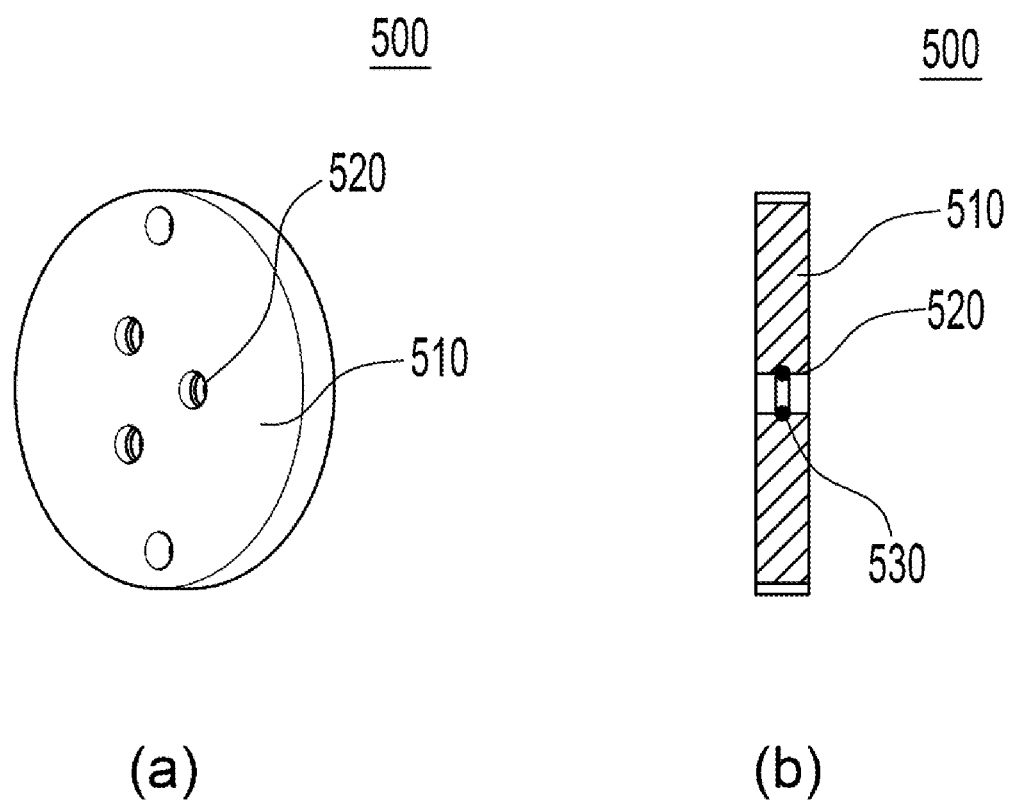
FIG. 5 shows a perspective view and a cross-sectional view illustrating a sealing sleeve according to an embodiment of the present invention.

FIG. 5 shows a perspective view and a cross-sectional view illustrating a sealing sleeve according to an embodiment of the present invention.

The sealing sleeve 500 may seal at least one side of the flexible joint pipe 200 while allowing the power line 4000 to pass through the inside of the sealing sleeve 500. A material of the sealing sleeve 500 may include silicone, Teflon, or the like, but the present invention is not limited thereto.

Specifically, the sealing sleeve 500 may include a sleeve body 510, at least one communication hole 520 formed to be open in the sleeve body 510, and at least one sealing ring 530 provided along a circumference of the communication hole 520.

The sleeve body 510 is flat and may have a shape corresponding to an end portion of the flexible joint pipe. The sleeve body 510 may be provided between the power supply pipe 100 and the flexible joint pipe 200 to be mounted by flange engagement with the flexible joint pipe 200 and the flange portion of the power supply pipe 100 through bolt engagement and/or may be provided between the flexible joint pipe 200 and the joint box of and the power supply unit 3000 to be mounted by flange engagement with the flexible joint pipe 200 and the flange portion of the power supply unit 3000 through bolt engagement. However, the present invention is not limited thereto.

The communication hole 520 may be formed to pass through an inner region of the sealing sleeve 500. The power line 4000 may pass through the communication hole 520, and for sealing, the communication hole 520 may have a shape corresponding to the power line 4000.

At least one sealing ring 530 may be provided along an inner circumference of the communication hole 520. The sealing ring 530 may be brought into close contact with the power line 4000 to further improve the sealing performance. A seating groove may be formed along the inner circumference to allow the sealing ring 530 to be stably disposed.

The sealing sleeve 500 shown in FIG. 5 is exemplary, and various configurations may be applied according to embodiments of the present invention.

While the present invention has been shown and described above with reference to specific embodiments thereof, various changes and modification may be derived by those skilled in the art from the above description. For example, it should be understood that an appropriate result may be achieved even when components of the described systems, structures, devices, circuits, and the like are coupled or combined in a form different from the described methods, or substituted or replaced with other components or equivalents. In addition, the embodiments can be operated in combination with each other as necessary. For example, the operation of the device may be performed by combining parts of one embodiment and another embodiment of the present invention. Therefore, other implementations, other embodiments, and equivalents to the appended claims fall within the scope of the following claims.

The invention claimed is:

1. A power supply apparatus for detecting a gas leak, the power supply apparatus comprising:
   a power supply pipe connected to a pump;
   a flexible joint pipe whose one side is connected to the power supply pipe and an other side is connected to a power supply unit;
   a power inlet unit disposed on the power supply pipe; and
   a leak detection unit configured to fill the power supply pipe with an inert gas and detect a gas leak according to a change in pressure,
   wherein a power line supplying power to a motor in the pump from the power supply unit passes through the power supply pipe,
   wherein one side of the power inlet unit faces the pump and an other side faces the power supply unit configured to connect the power line and prevent a gas in the pump from leaking from the one side to the other side,
   wherein the leak detection unit includes:

a gas discharge unit configured to discharge the inert gas in the power supply pipe;

a discharge pipe connecting a discharge unit of the power supply pipe to the gas discharge unit; and a controller configured to control an inflow and discharge of the inert gas and detect leakage of the inert gas, and wherein, when the pressure in the discharge pipe increases or becomes greater than a first critical pressure, the controller determines that an active gas in the pump leaks, and when the pressure in the discharge pipe decreases or becomes lower than a second critical pressure, the controller determines that the inert gas leaks from the leak detection unit.

2. The power supply apparatus of claim 1, wherein the flexible joint pipe is separated from the power supply unit by separating and bending only the other side of the flexible joint pipe from the power supply unit in a state in which the one side of the flexible joint pipe is coupled to the power supply pipe.

3. The power supply apparatus of claim 1, further comprising a support configured to support the flexible joint pipe in a state in which one region of the flexible joint pipe is seated on the support and the other side of the flexible joint pipe is separated from the power supply unit.

4. The power supply apparatus of claim 1, wherein a sealing sleeve for sealing is disposed on at least one of the one side and the other side of the flexible joint pipe, at least one communication hole through which the power line passes is formed at an inner side of the sealing sleeve, and at least one sealing ring is provided along a circumference of the at least one communication hole.

5. The power supply apparatus of claim 1, wherein the leak detection unit further includes:

a gas supply unit configured to supply the inert gas to the power supply pipe;

an inlet pipe connecting the gas supply unit to an inlet unit of the power supply pipe;

an inlet valve provided at the inlet pipe and configured to control an inlet flow of the inert gas;

a discharge valve provided at the discharge pipe and configured to control a discharge flow of the inert gas; and a pressure gauge provided at the discharge pipe and configured to measure a pressure of the inert gas in the discharge pipe.

6. The power supply apparatus of claim 5, wherein, after the inert gas is supplied to the power supply pipe, the controller closes the inlet valve and the discharge valve and maintains an inside of the power supply pipe at a predetermined reference pressure, and when the pressure in the discharge pipe increases or decreases from the predetermined reference pressure, the controller determines that the gas leak occurs.

7. The power supply apparatus of claim 5, wherein, when gas leakage occurs, the controller supplies the inert gas by opening the inlet valve.

8. The power supply apparatus of claim 5, wherein, when gas leakage occurs, the controller closes the inlet valve and opens the discharge valve to discharge the gas in the discharge pipe.

9. The power supply apparatus of claim 1, wherein the power supply pipe includes a plurality of pipes, and the power inlet unit is flange-coupled between the plurality of pipes.

10. A power supply apparatus for detecting a gas leak, the power supply apparatus comprising:

a power supply pipe connected to a pump;

a flexible joint pipe whose one side is connected to the power supply pipe and an other side is connected to a power supply unit;

a power inlet unit disposed on the power supply pipe; and a leak detection unit configured to fill the power supply pipe with an inert gas and detect a gas leak according to a change in pressure, the leak detection unit having:

a gas supply unit configured to supply the inert gas to the power supply pipe, an inlet pipe connecting the gas supply unit to an inlet unit of the power supply pipe, a gas discharge unit configured to discharge the inert gas in the power supply pipe, a discharge pipe connecting a discharge unit of the power supply pipe to the gas discharge unit, an inlet valve provided at the inlet pipe and configured to control an inlet flow of the inert gas, a discharge valve provided at the discharge pipe and configured to control a discharge flow of the inert gas, a pressure gauge provided at the discharge pipe and configured to measure a pressure of the inert gas in the discharge pipe, and a controller configured to control an inflow and discharge of the inert gas and detect leakage of the inert gas, wherein a power line supplying power to a motor in the pump from the power supply unit passes through the power supply pipe, wherein one side of the power inlet unit faces the pump and an other side faces the power supply unit configured to connect the power line and prevent a gas in the pump from leaking from the one side to the other side, and wherein, when gas leakage occurs, the controller supplies the inert gas by opening the inlet valve.

11. The power supply apparatus of claim 10, wherein the flexible joint pipe is separated from the power supply unit by separating and bending only the other side of the flexible joint pipe from the power supply unit in a state in which the one side of the flexible joint pipe is coupled to the power supply pipe.

12. The power supply apparatus of claim 10, further comprising a support configured to support the flexible joint pipe in a state in which one region of the flexible joint pipe is seated on the support and the other side of the flexible joint pipe is separated from the power supply unit.

13. The power supply apparatus of claim 10, wherein, after the inert gas is supplied to the power supply pipe, the controller closes the inlet valve and the discharge valve and maintains an inside of the power supply pipe at a predetermined reference pressure, and when the pressure in the discharge pipe increases or decreases from the predetermined reference pressure, the controller determines that the gas leak occurs.

14. The power supply apparatus of claim 10, wherein, when the pressure in the discharge pipe increases or becomes greater than a first critical pressure, the controller determines that an active gas in the pump leaks, and when the pressure in the discharge pipe decreases or becomes lower than a second critical pressure, the controller determines that the inert gas leaks from the leak detection unit.

15. The power supply apparatus of claim 10, wherein, when gas leakage occurs, the controller closes the inlet valve and opens the discharge valve to discharge the gas in the discharge pipe.

16. A power supply apparatus for detecting a gas leak, the power supply apparatus comprising:
- a power supply pipe connected to a pump;
- a flexible joint pipe whose one side is connected to the power supply pipe and an other side is connected to a power supply unit;
- a power inlet unit disposed on the power supply pipe; and
- a leak detection unit configured to fill the power supply pipe with an inert gas and detect a gas leak according to a change in pressure, the leak detection unit having:
  - a gas supply unit configured to supply the inert gas to the power supply pipe,
  - an inlet pipe connecting the gas supply unit to an inlet unit of the power supply pipe,
  - a gas discharge unit configured to discharge the inert gas in the power supply pipe,
  - a discharge pipe connecting a discharge unit of the power supply pipe to the gas discharge unit,
  - an inlet valve provided at the inlet pipe and configured to control an inlet flow of the inert gas,
  - a discharge valve provided at the discharge pipe and configured to control a discharge flow of the inert gas,
  - a pressure gauge provided at the discharge pipe and configured to measure a pressure of the inert gas in the discharge pipe, and
  - a controller configured to control an inflow and discharge of the inert gas and detect leakage of the inert gas,
- wherein a power line supplying power to a motor in the pump from the power supply unit passes through the power supply pipe,
- wherein one side of the power inlet unit faces the pump and an other side faces the power supply unit configured to connect the power line and prevent a gas in the pump from leaking from the one side to the other side, and
- wherein, when gas leakage occurs, the controller closes the inlet valve and opens the discharge valve to discharge the gas in the discharge pipe.

17. The power supply apparatus of claim 16, wherein a sealing sleeve for sealing is disposed on at least one of the one side and the other side of the flexible joint pipe, at least one communication hole through which the power line passes is formed at an inner side of the sealing sleeve, and at least one sealing ring is provided along a circumference of the at least one communication hole.

18. The power supply apparatus of claim 16, wherein, after the inert gas is supplied to the power supply pipe, the controller closes the inlet valve and the discharge valve and maintains an inside of the power supply pipe at a predetermined reference pressure, and when the pressure in the discharge pipe increases or decreases from the predetermined reference pressure, the controller determines that the gas leak occurs.

19. The power supply apparatus of claim 16, wherein, when the pressure in the discharge pipe increases or becomes greater than a first critical pressure, the controller determines that an active gas in the pump leaks, and when the pressure in the discharge pipe decreases or becomes lower than a second critical pressure, the controller determines that the inert gas leaks from the leak detection unit.

20. The power supply apparatus of claim 16, wherein, when gas leakage occurs, the controller supplies the inert gas by opening the inlet valve.

* * * * *